United States Patent [19]

Hetrich

[11] 3,866,123

[45] Feb. 11, 1975

[54] BROADCAST NETWORK SIGNALING SYSTEM AND METHOD

[75] Inventor: Wayne L. Hetrich, District Heights, Md.

[73] Assignee: National Public Radio, Washington, D.C.

[22] Filed: Feb. 28, 1973

[21] Appl. No.: 336,756

[52] U.S. Cl. .................... 325/53, 325/64
[51] Int. Cl. .................... H04b 1/16
[58] Field of Search .................... 325/51–55, 325/64, 66, 392, 393, 395, 466, 62, 63, 161, 164, 168, 47, 143, 346, 349, 423; 329/124

[56] References Cited

UNITED STATES PATENTS 3,470,475 9/1969 Peterson et al. .................... 325/63
3,628,153 12/1971 Fukata .................... 325/64
3,657,655 4/1972 Fukata .................... 325/64

*Primary Examiner*—Robert L. Griffin
*Assistant Examiner*—George H. Libman
*Attorney, Agent, or Firm*—Burns, Doane, Swecker & Mathis

[57] ABSTRACT

A method and system for providing control signals or "que's" to the interconnected individual stations of a network of stations. One or more of a plurality of control signals are simultaneously superimposed on the program signal and evaluated at the individual member stations for amplitude, frequency and duration.

11 Claims, 4 Drawing Figures

BROADCAST NETWORK SIGNALING SYSTEM AND METHOD

BACKGROUND OF THE INVENTION

The present invention relates to method and system for transmitting control signals or "que's" to the member stations of a network of radio or television stations.

In networks such as the network of over 100 interconnected stations in the National Public Radio System, it is important to be able to interrupt the local programming for emergency announcements, news events and the like. In addition, there are many control functions to be performed involving program advisories, changes in the program schedule, cancellation of feeds, and the like. In addition, networks such as the National Public Radio System extensively test the round robin transmission of signals as many as three of more times daily.

In an effort to fill this control signaling void, one system currently in use includes the insertion of a transmitter in the outgoing program transmission line to the exclusion of the program signal source for the purpose of introducing three successive tone bursts. In an effort to reduce false alarms, this system interrupts the program signal for an initial period to permit any ringing on the line to subside. For the same reason, the program is interrupted for a period following the transmission of the tones. While systems of this type reduce the possibility of false alarms by the temporal separation of the program and control signals, the period of program interruption may thus become excessive.

In decoding the control signals, the prior art systems have relied heavily on an elevation of the purity of the control signal. If by the interruption of the program signal only the control signal is present, i.e., no program signal or noise is present, the receiver may function correctly. If, however, the program, noise or other spurious signals are present, the receiver will now operate. This technique fail-safe reduces false alarms, but may lead to the failure of the system to respond to a proper control signal.

In addition, known systems have generally relied on electromechanical means for decoding the control signals. These decoding means have generally included slug tuned coils easily detuned in transit and requiring adjustment at the cite of installation.

It is accordingly an object of the present invention to obviate the deficiencies of known network control signal systems and to provide a novel method and system for introducing control signals on network transmission lines.

It is another object of the present invention to provide a novel method and network signaling system which does not interrupt the network programming.

It is still another object of the present invention to provide a novel method and network signaling system in which the control signals are simultaneously rather than sequentially transmitted.

It is yet another object of the present invention to provide a novel method and network signaling system in which the control signals are decoded by electrical rather than electromechanical means.

It is a further object of the present invention to provide a novel method and network signaling system in which the need for the remote adjustment of the decoding apparatus has been obviated.

Yet a further object of the present invention is to provide a novel method and network signaling system in which a substantial reduction in the volume, weight and cost over known systems has been achieved.

It is still a further object of the present invention to provide a novel method and network signaling system in which the control signals are evaluated in amplitude, frequency and duration.

These and many other objects and advantages of the present invention will be apparent from the claims and from the following detailed description when read in conjunction with the appended drawings.

THE DRAWINGS

THE DETAILED DESCRIPTION

Figure 1:
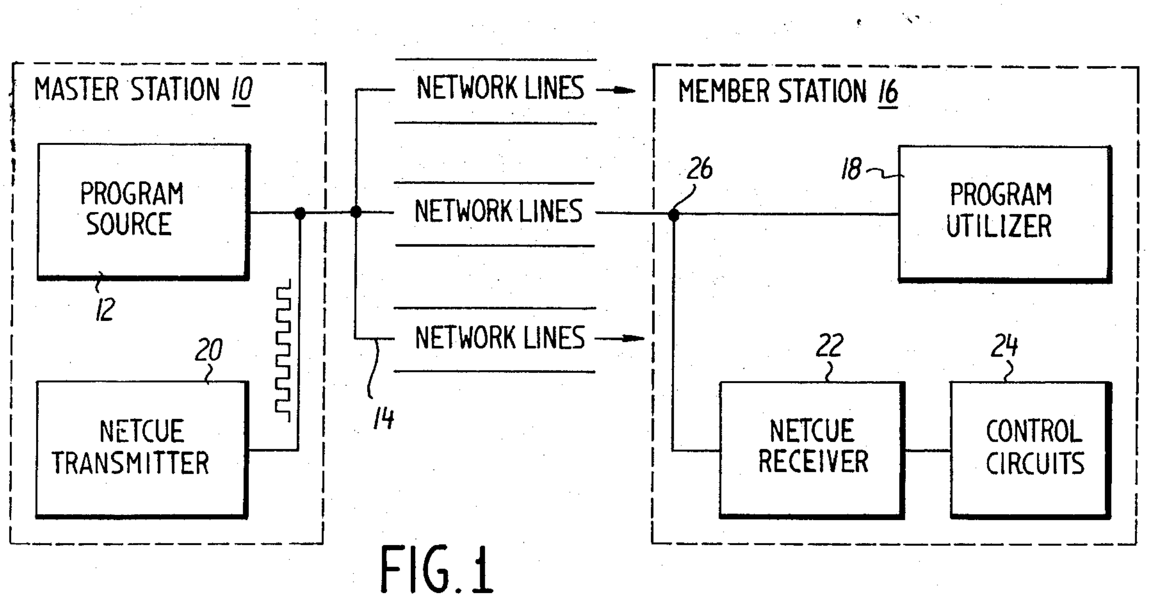
FIG. 1 is a functional block diagram of the system of the present invention.

With reference now to FIG. 1, a master station 10 includes any suitable conventional program source 12 interconnected by a transmission system employing network lines 14 to the individual member stations such as that illustrated as station 16. Each of the interconnected member stations may include a program utilizer 18 which may be entirely conventional in its operation.

The present invention requires the addition of a NetCUE™ transmitter 20 at the master station 10. The NetCUE transmsitter 20 may be connected by any suitable conventional means to the network lines 14 whereby the output signals therefrom may be superimposed on the output signals from the program source 12. The NetCUE transmitter 20 may include a plurality of suitable conventional tone generators each selectively enabled to provide one or more control tones.

At each of the member stations such as the member station 16 illustrated in FIG. 1, a NetCUE receiver 22 as hereinafter described in greater detail in connection with FIG. 2 may be connected to the incoming network line and the output signals therefrom may be applied to any suitable conventional control circuits 24 to perform the desired control functions.

The NetCUE receiver 22 performs the evaluation of the signal received over the network lines 14. As will be hereinafter explained subsequently in more detail in connection with FIG. 2, the NetCUE receiver 22 evaluates the received signals for amplitude, frequency and duration.

Figure 2:
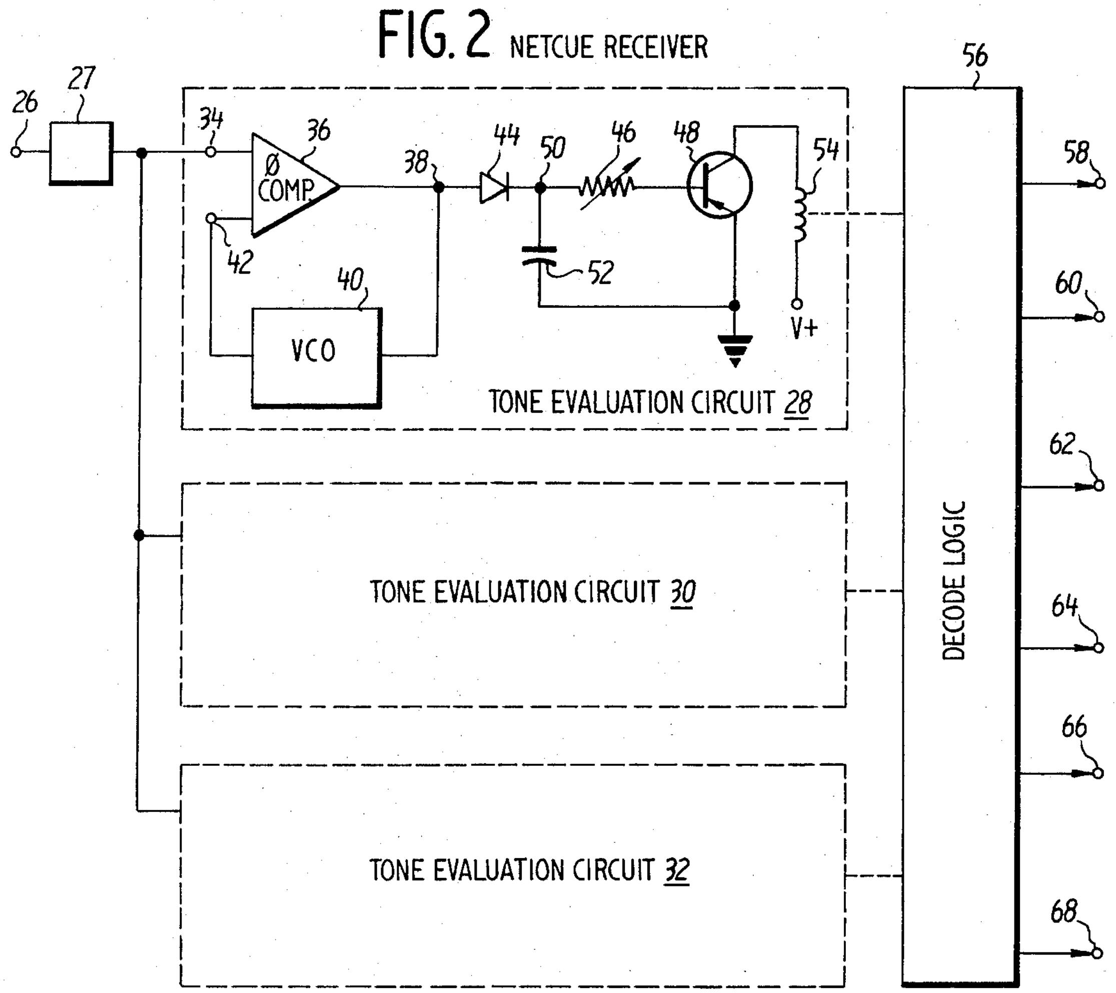
FIG. 2 is a schematic circuit diagram of the receiver and control signal decoder of the system of FIG. 1.

With reference now to FIG. 2, the NetCUE receiver 22 may be connected by way of an input terminal 26 to the network lines 14. This signal may thereafter be simultaneously applied to each of three tone evaluation circuits 28, 30 and 32. The tone evaluation circuits 28, 30 and 32 may be identical in circuitry and in operation and only the circuit 28 will be hereinafter described.

With continued reference to FIG. 2, the signal from the network lines is applied by way of the input terminal 26 to one input terminal 34 of a two input terminal phase comparator 36, and the output signal from the phase comparator 36 fed back by way of an output terminal 38 through a suitable conventional voltage control oscillator 40 to the other input terminal 42 of the phase comparator 36. The output signal from the terminal 38 of the phase comparator 36 is also applied through a diode 44 and a variable resistor 46 to the base electrode of the ground emitter PNP transistor 48. The diode 44-resistor 46 interconnection 50 may be grounded through a capacitor 52 and the collector electrode of the transistor 48 connected through a relay coil 54 to the suitable source of positive potential.

The relay coil 54 may, together with the relay coils associated with each of the other tone evaluation circuits 30 and 32, be operatively connected to suitable electrical contacts within a decode logic circuit 56. The decode logic circuit 56 may be any suitable conventional logic circuit for detecting the operation of the tone evaluation circuits and for providing a unique signal on one of the output terminals 58–68 as a function of the possible permutations which may be achieved with three input signals. It will be recognized, of course, that the use of additional tone evaluation circuits will greatly increase the number of possible code permutations and thus the number of potential control functions which may be performed by the present invention.

In operation, the input signal available at the input terminal 26 of the tone evaluation circuit 28 is initially applied to the input terminal 34 of the phase comparator 36. Initially, due to the absence of a signal on the other input terminal 42 of the phase comparator 36 and thereafter, the phase comparator 36 will provide an output signal variable in amplitude and polarity as a function of the difference in phase of the signals applied to the two input terminals 34 and 42. This signal is utilized to control the frequency and thus the phase of the output signal from the voltage control oscillator 40 within predetermined limits as will subsequently be explained. The phase comparator 36 with the feedback path including the voltage control oscillator 40 thus attempts to track the input signal to thereby null or reduce to zero the output signal from the phase comparator 36, i.e., a zero frequency and phase differential between the input signals applied thereto.

In the presence of a dynamic program signal which varies widely in frequency, the phase comparator 36 will continue to provide an output signal. In this manner, the phase comparator 36 and the voltage control oscillator 40 function as a phase locked loop. As an example of a circuit which may be used for this purpose, the tone decoder Model No. SE/NE 567 available from the Signetics Corporation, Sunnyvale, Calif., has been found satisfactory.

The output signal from the phase locked loop is applied through the diode 44 to provide a unipolarity signal for maintaining a charge on the capacitor 52. A positive charge on the capacitor 52 will be reflected through the resistor 46 to the base electrode of the transistor 48 to ensure the conduction thereof. So long as the transistor 48 conducts, current will pass from the voltage source through the relay coil 54 and the emitter-collector path of the transistor 48 to maintain the relay contacts in the decode logic circuit 56 in a predetermined condition.

Should, however, a constant tone be present on the input terminal 34 of the phase comparator 36, the output signal of the phase comparator 36 will go to zero through the operation of the phase locked loop. As a result, the capacitor 52 will no longer receive a charging current and the charge previously stored on the capacitor 52 will be drained through the potentiometer 46 and the base-emitter path of the transistor 48. When the charge on the capacitor 52 is lowered sufficiently, the conduction of the transistor 48 will cease to thereby interrupt the flow of current through the relay coil 54 and to thereby effect a change in the condition of the relay contacts within the decode logic circuit 56. The change in relay contact condition will indicate that a particular tone or "que" is present on the network lines 14.

The potentiometer 46 may be utilized to control the time required for the capacitor 52 to discharge sufficiently to drive the transistor 48 into cutoff. This time delay is useful in the evaluation of the control signal for duration in that it requires that the tone be present on the network lines 14 for a period of time sufficient to ensure that the tone is not one randomly appearing as noise or as a part of the program signal. The control signals are selected to be nonmusical to reduce the possibility that the program signal includes a tone of the necessary duration.

The tone evaluation circuit 28 as described above would be responsive to operate the relay 54 at any constant frequency but for the frequency limits of the response of the voltage control oscillator 40. By restricting the frequency response of the voltage control oscillator 40 to a narrow bandwidth centered about one of the predetermined and desirably nonmusical tones utilized as control signals, each of the tone evaluation circuits 28, 30 and 32 may be made responsive to a very precise tone mutually exclusive of the other tone evaluation circuits. A preferable bandwidth has been found to be about 2 to 3 percent of the frequency of the control signal.

Amplitude evaluation of the control signals is accomplished by the system of the present invention through the use of an attenuator element 27 which reduces the detected program signal amplitude to a predetermined level. This attenuation of program signal amplitude also reduces the amplitude of the control signals superimposed thereon.

The phase comparator 36 may inherently have a threshold level sufficient to eliminate the response of the phase comparator to signals at the proper frequency but below the known amplitude of the attenuated control signals. Alternatively, a suitable conventional threshold circuit (not shown) may be inserted between the attenuator 27 and the input terminal 34 of the phase comparator 36 of the NetCue receiver illustrated in FIG. 2.

The evaluation of the control signals or "que's" as above described thus eliminates signals which happen to be at the proper frequency for the proper time but insufficient in amplitude relative to the program signal level, signals which have sufficient amplitude and the proper frequency but which are insufficient in duration, and signals which are sufficient in amplitude and duration but vary in frequency beyond the narrow frequency response limits of the voltage control oscillators. Remarkable reliability in response is thus achieved.

Figure 3:
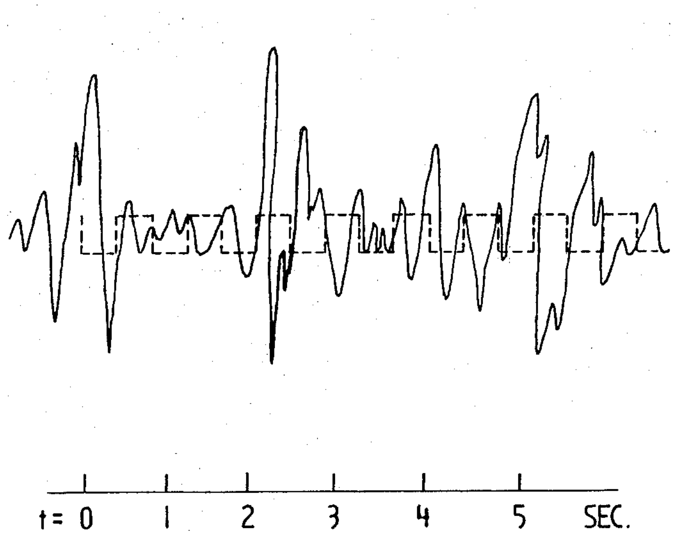
FIG. 3 is a pictorial representation of a program signal having the control signals of the present invention superimposed thereon; and, FIG. 4 is a pictorial representation of one known network signaling system illustrating the interruption of the program signals.

With reference now to FIG. 3, a program signal is illustrated over a period in excess of five seconds. A predetermined control tone is illustrated in broken lines over a predetermined time interval. While not illustrated, the signal resulting from the algebraic addition of the two illustrated signals can be readily shown to vary only slightly from the program signal.

This predetermined time interval for control signal imposition is five seconds in the preferred embodiment herein described. The selection of nonmusical tones for the control signals mitigates against the possibility that a tone of the proper frequency can be present as part of the program signal for a period of time sufficient to effect the operation of the relay 54 earlier described in connection with the NetCue receiver 22 of FIG. 2.

Figure 4:
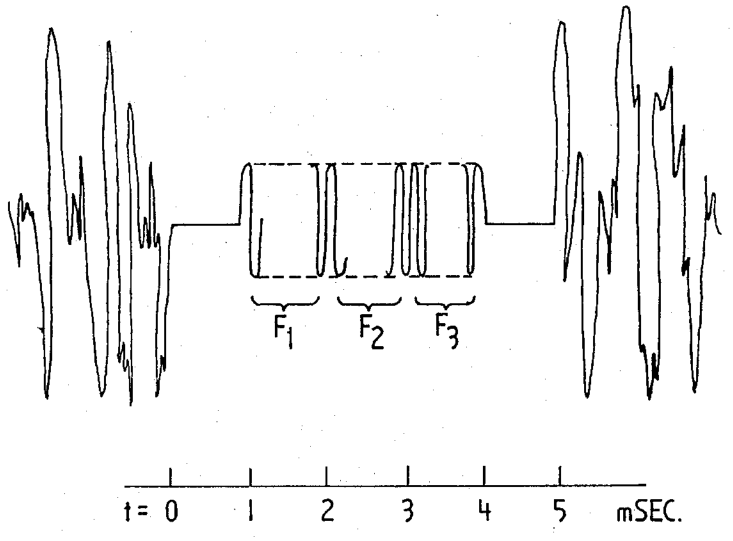
FIG.4 (PRIOR ART)

In contrast to the prior art system illustrated in FIG. 4, the system of the present invention does not interrupt the program signal. With reference to FIG. 4, the program signal is typically interrupted at time $T=0$ for a 10 millisecond interval followed by the sequential generation of three 10 millisecond duration tones $F_1$, $F_2$ and $F_3$. Following the third tone $F_3$, the signal is again interrupted for a 10 millisecond interval before the program signal is renewed. As is evident from FIG. 4, the net result is an interruption in the program signal for a period of 50 milliseconds or more.

ADVANTAGES AND SCOPE OF THE INVENTION

As will be apparent from the foregoing, the method and system of the present invention functions by superimposing steady tones or combinations of tones on the normal network audio program signal. These tone control signals are detected almost instantly and reliably by a phase locked loop sensing device at each of the individual member stations. These control signals may be used to start and stop audio recorders to record special programs for later broadcast, to accomplish the switching of local and network programs, to interrupt programming for emergency announcements, etc.

The system of the present invention has proven to be totally free from false triggering due to normal program signal audio which dynamically encompass a very wide range of intermodulation products. In addition, the use of telephone lines with a limited frequency response as the network lines increases the magnitude of the problem. The problem is further accentuated for networks such as the National Public Radio network where the standards are substantially higher than the technical requirements of the Federal Communications Commission with regard to commercial broadcasting. Testing against these standards generally includes an evaluation of frequency response utilizing discrete tones, harmonic distortion, hum noise and slow sweeps through an entire spectrum of program frequency interest. In 2 months of operation in a worst case mode in which control signals were transmitted over literally thousands of miles of "round robin" line, the system has proven extremely reliable.

The control signals of the present invention are preferably sent over the network lines during non-program periods such as the normal one minute station break between programs. The frequencies preferred for a three control signal system are 1,357 Hz, 678.5 Hz, and 2,714 Hz, respectively, and may be as much as 10 dB below normal program signal levels. Operation of the system over commercially installed class C telephone lines has proven satisfactory.

By virtue of the utilization of the system as above described, a reduction in the cost of known systems on the order of 50 to 1 has been achieved together with a size and weight reduction on the order of 150 to 1. The delicate adjustment of slug tuned coils at the member stations by personnel not necessarily technically trained has been avoided. Moreover, the use of solid state electronics in lieu of the electromechanical devices of known systems has further increased the reliability of the system.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of alerting the interconnected individual member stations of a radio network to network operational changes comprising the steps of:

a. transmitting an audio program to the member stations in the network as an electrical program signal;
b. superimposing for a predetermined time interval at least one of a plurality of nonmusical tones each having a predetermined amplitude and frequency on the transmitted program signal without interrupting the program signal;
c. receiving the transmitted signal including superimposed tones at one of the member stations;
d. evaluating the amplitude of any receiving tones against a predetermined standard of amplitude;
e. generating an output signal having a frequency controllable within predetermined limits about a predetermined frequency;
f. evaluating the frequency relationship between the output signal and the received signal;
g. charging a capacitor in response to other than a desired frequency relationship between the output signal and the received signal;
h. discharging the capacitor at a predetermined rate in response to the desired frequency relationship between the output signal and the received signal; and,
i. providing one of a predetermined plurality of control signals in response to an acceptable amplitude evaluation and the discharge of the capacitor below a predetermined value.

2. The method of claim 1 wherein the frequency relationship evaluation includes the comparison of the phase of the received signal with the output signal from a voltage control oscillator which is responsive in frequency within predetermined limits to the phase differential.

3. The method of claim 2 wherein the predetermined limits in the frequency response of the voltage control oscillator are about 3 percent of the frequency of a desired nonmusical tone.

4. The method of claim 2 wherein the evaluation of a received tone for amplitude includes the reduction in the amplitude of the received signal to a predetermined value and thereafter evaluating only signals exceeding a predetermined percentage of the predetermined value to which the received signal is reduced.

5. The method of claim 3 wherein the evaluation of a tone for amplitude includes the reduction in the amplitude of the detected signal to a predetermined value and thereafter evaluating only signals exceeding a predetermined percentage of the predetermined value to which the received signal is reduced.

6. The method of claim 1 wherein the evaluation of a received tone for amplitude includes the reduction in the amplitude of the received signal to a predetermined value and thereafter evaluating only signals exceeding a predetermined percentage of the predetermined value to which the received signal is reduced.

7. A system for alerting the interconnected individual member stations of a radio network to network operational changes comprising:

means for superimposing for a predetermined time interval at least one of a plurality of nonmusical tones each having a predetermined amplitude and frequency on the transmitted signal without interrupting the transmission of the program signal;

means for receiving the transmitted signal including superimposed tones at one of the member stations;

means for evaluating the amplitude of any received tones against a predetermined standard of amplitude;

means for generating an output signal having a frequency controllable within predetermined limits about a predetermined frequency;

a capacitor;

means for evaluating the frequency relationship between the output signal and the received tones and for charging the capacitor in response to other than a desired frequency relationship therebetween;

means for discharging the capacitor at a predetermined rate, the capacitor discharging to a predetermined level in response to the evaluation of the desired frequency relationship between the output signal and the received tones for a predetermined period of time; and, means responsive to said amplitude evaluating means and the discharge of said capacitor to said predetermined level for providing one of a predetermined plurality of control signals.

8. The system of claim 7 wherein said frequency evaluating means includes:

a phase locked loop severely limited in the bandwidth of the frequency response thereof.

9. The system of claim 8 wherein the bandwidth of the frequency response of said phase locked loop is about 3 percent of the frequency of one of the detected tones.

10. The system of claim 7 wherein said frequency evaluating means includes:

a phase comparator;

means for applying the received signal to one input terminal thereof; and, a voltage control oscillator operatively connected to the other input terminal and the output terminal of said phase comparator for providing a feedback signal related in frequency within predetermined limits to the amplitude of the output signal from said phase comparator.

11. The system of claim 7 wherein said amplitude and frequency evaluating means includes an attenuator, a phase locked loop limited in frequency response to within predetermined limits, a rectifier, timing means, and switch means all connected in series.

* * * * *

UNITED STATES PATENT OFFICE
CERTIFICATE OF CORRECTION

Patent No. 3,866,123 Dated February 11, 1975

Inventor(s) Wayne L. Hetrich

It is certified that error appears in the above-identified patent and that said Letters Patent are hereby corrected as shown below:

In the drawings, Sheet 1, Figure 2, the member 48 should appear as follows:

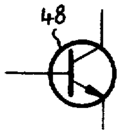

Column 1, line 39, delete "now" and substitute therefor --not--.

Column 3, line 6, delete "PNP" and substitute therefor --NPN--.

Signed and sealed this 17th day of June 1975.

(SEAL)
Attest:

RUTH C. MASON
Attesting Officer

C. MARSHALL DANN
Commissioner of Patents
and Trademarks